United States Patent
Pepper

(10) Patent No.: US 7,380,074 B2
(45) Date of Patent: May 27, 2008

(54) SELECTING STORAGE CLUSTERS TO USE TO ACCESS STORAGE

(75) Inventor: Timothy C. Pepper, Tigard, OR (US)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 11/286,847

(22) Filed: Nov. 22, 2005

(65) Prior Publication Data

US 2007/0118706 A1 May 24, 2007

(51) Int. Cl.
*G06F 12/00* (2006.01)
*G06F 15/167* (2006.01)

(52) U.S. Cl. .................. 711/152; 711/163; 709/216; 710/17

(58) Field of Classification Search ............. 711/152, 711/154, 163; 710/15, 17; 709/216, 238, 709/240, 241
See application file for complete search history.

(56) References Cited

U.S. PATENT DOCUMENTS

| 6,343,324 | B1 | 1/2002 | Hubis et al. |
| 6,587,970 | B1 | 7/2003 | Wang et al. |
| 6,738,818 | B1 | 5/2004 | Shah |
| 6,820,171 | B1 | 11/2004 | Weber et al. |
| 2004/0003171 | A1 | 1/2004 | Basham et al. |
| 2004/0054866 | A1 | 3/2004 | Blumenau et al. |
| 2004/0059830 | A1 | 3/2004 | Brown |
| 2005/0010682 | A1 | 1/2005 | Amir et al. |

*Primary Examiner*—Jack Lane
(74) *Attorney, Agent, or Firm*—David W. Victor; Konrad Raynes & Victor LLP

(57) ABSTRACT

Provided are a method, system and program for selecting storage clusters to use to access storage. Input/Output (I/O) requests are transferred to a first storage cluster over a network to access storage. The storage may be additionally accessed via a second storage cluster over the network and both the first and second storage clusters are capable of accessing the storage. An unavailability of a first storage cluster is detected when the second storage cluster is available. A request is transmitted to hosts over the network to use the second storage cluster to access the storage. Hosts receiving the transmitted request send I/O requests to the storage via the second storage cluster if the second storage cluster is available.

5 Claims, 8 Drawing Sheets

SELECTING STORAGE CLUSTERS TO USE TO ACCESS STORAGE

BACKGROUND OF THE INVENTION

1. Field of the Invention

The present invention relates to a method, system, and program for selecting storage clusters to use to access storage.

2. Description of the Related Art

Host systems in a storage network may communicate with a storage controller through multiple paths. The storage controller may be comprised of separate storage clusters, where each storage cluster is capable of accessing the storage and provide redundancy to access the storage. If a storage cluster fails, then the host may failover to using the other storage cluster to access the storage.

In certain systems, if a storage cluster receives Input/Output (I/O) requests to a storage location, such as a track or volume, that are the subject of I/O requests pending at another storage controller, then the storage cluster receiving the I/O requests will transfer them to the other storage controller to minimize the extent to which different storage clusters apply I/Os to a same storage location. Data consistency errors may result if separate storage controllers write data in an inconsistent manner to a same storage location. This process where a storage cluster transfers I/O requests to another storage cluster to consolidate I/O requests to a same storage location at one storage cluster requires that I/O requests be quiesced to the clusters involved in the transfer during the time that the transfer occurs. This transfer of I/O requests and writes between storage controllers degrades the storage controller performance.

There is a need in the art for improved techniques for managing how hosts may select which of multiple storage clusters to use to access a storage.

SUMMARY

Provided are a method, system and program for selecting storage clusters to use to access storage. Input/Output (I/O) requests are transferred to a first storage cluster over a network to access storage. The storage may be additionally accessed via a second storage cluster over the network and both the first and second storage clusters are capable of accessing the storage. An unavailability of a first storage cluster is detected when the second storage cluster is available. A request is transmitted to hosts over the network to use the second storage cluster to access the storage. Hosts receiving the transmitted request send I/O requests to the storage via the second storage cluster if the second storage cluster is available.

Further provided are a method, system and program for processing a network topology to determine hosts connections to first and second storage clusters, wherein the hosts may access a storage through the first and second storage clusters. Selection is made of one of the first and second storage clusters to which all the hosts have access in response to determining that all the hosts have access to the selected storage cluster. Selection is made of one of the first and second storage clusters to which less than all the hosts have access based on a selection policy in response to determining that less than all the hosts have access to the first and second storage clusters. A message is sent to the hosts having access to the selected storage cluster to use the selected storage cluster to access the storage.

DETAILED DESCRIPTION

Figure 1:
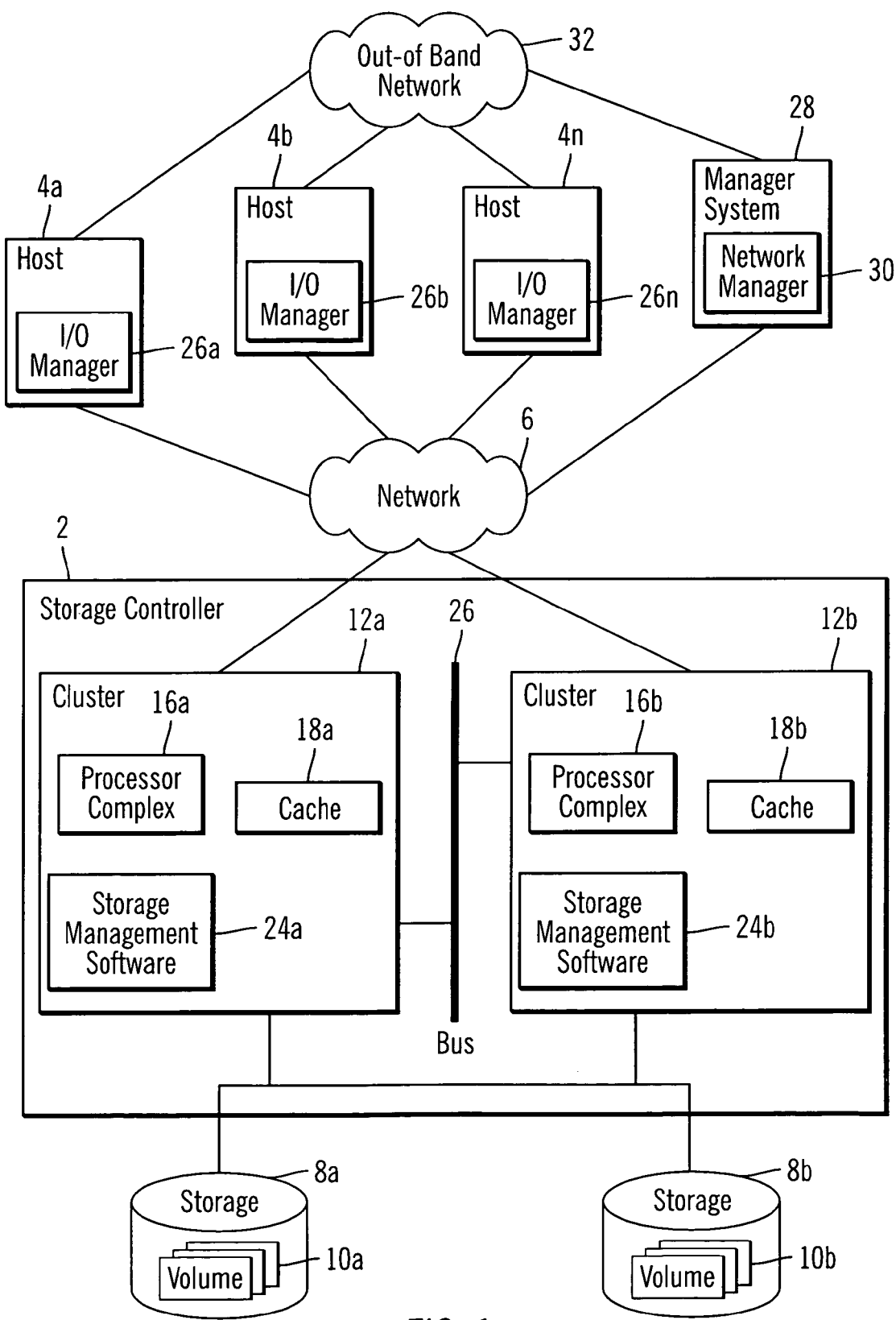
FIG. 1 illustrates an embodiment of a network computing environment.

FIG. 1 illustrates an embodiment of a network computing environment. A storage controller 2 receives Input/Output (I/O) requests from host systems 4a, 4b . . . 4n over a network 6 directed toward storages 8a, 8b each configured to have one or more volumes 10a, 10b (e.g., Logical Unit Numbers, Logical Devices, etc.). The storage controller 2 includes two clusters 12a, 12b, each including a processor complex 16a, 16b and a cache 18a, 18b. The clusters 12a, 12b receive I/O requests from the hosts 4a, 4b . . . 4n and buffer the requests. The clusters 12a, 12b buffer data to write to the storages 8a, 8b and buffer data read from the storages 8a, 8b to return in their respective cache 18a, 18b. The clusters 12a, 12b may include additional components, such as a non-volatile storage unit (not shown) to provide backup storage of updates in the cache 18a, 18b. The clusters 12a, 12b may have different power boundaries. In the described embodiment, each storage cluster 12a, 12b provides access to attached storage comprising the storages 8a, 8b. Each cluster 12a, 12b includes storage management software 24a, 24b executed by the processor complexes 16a, 16b to process host 4a, 4b . . . 4n I/O requests. A bus 26 provides a communication interface to enable communication between the clusters 12a, 12b. The bus may comprise any communication interface known in the art, such as Peripheral Component Interconnect (PCI) bus, or other bus interfaces, or a network communication interface, such as a Wide Area Network (WAN), Storage Area Network (SAN), Local Area Network (LAN), the Internet, a wireless network, etc.

The hosts 4a, 4b . . . 4n include an I/O manager 26a, 26b . . . 26n program to manage the transmission of I/O requests to the storage clusters 12a, 12b over the network 6. In certain embodiments, the environment may further include a manager system 28 including a network manager program 30 to coordinate host 4a, 4b . . . 4n access to the storage cluster to optimize operations.

The hosts 4a, 4b . . . 4n and manager system 28 (if used) may communicate over an out-of-band network 32 with respect to the network 6. The hosts 4a, 4b . . . 4n may communicate their storage network 6 topology information to the manager system 28 over the out-of-band network 32 and the manager system 28 may communicate with the hosts 4a, 4b . . . 4n over the out-of-band network 32 to coordinate host use of the storage clusters 12a, 12b. Alternatively, the hosts 4a, 4b . . . 4n, manager system 28, and storage controller 2 may communicate I/O requests and coordination related information over a single network, e.g., network 6.

The storage controller 2 may comprise suitable storage controllers or servers known in the art, such as the International Business Machines (IBM®) Enterprise Storage Server® (ESS) (IBM and Enterprise Storage Server are registered trademarks of IBM®). Alternatively, the storage controller 2 may comprise a lower-end storage server as opposed to a high-end enterprise storage server. The clusters 12a, 12b may be in the same storage controller 2 as shown in FIG. 1 or in different storage controllers. The hosts 4a, 4b . . . 4n may comprise computing devices known in the art, such as a server, mainframe, workstation, personal computer, hand held computer, laptop, telephony device, network appliance, etc. The storage network 6 may comprise a Storage Area Network (SAN), Local Area Network (LAN), Intranet, the Internet, Wide Area Network (WAN), etc. The out-of-band network 32 may be separate from the storage network 6, and use network technology, such as LAN. The storage 8a, 8b may comprise an array of storage devices, such as a Just a Bunch of Disks (JBOD), Direct Access Storage Device (DASD), Redundant Array of Independent Disks (RAID) array, virtualization device, tape storage, flash memory, etc.

The hosts 4a, 4b . . . 4n may communicate with either storage cluster 12a, 12b to access the storages 8a, 8n. Each host 4a, 4b . . . 4n may have separate paths through separate adaptors (and possibly switches) to the storage clusters 12a, 12b, so that if one path fails to one storage cluster 12a, 12b, the host 4a, 4b . . . 4n may continue to access storage 8a . . . 8n over the other path and adaptor. Each adaptor may include multiple ports providing multiple end points of access.

FIG. 1 shows that each cluster 12a, 12b includes its own cache 18a, 18b. In alternative embodiments, multiple clusters may share a single cache.

Figure 2A:
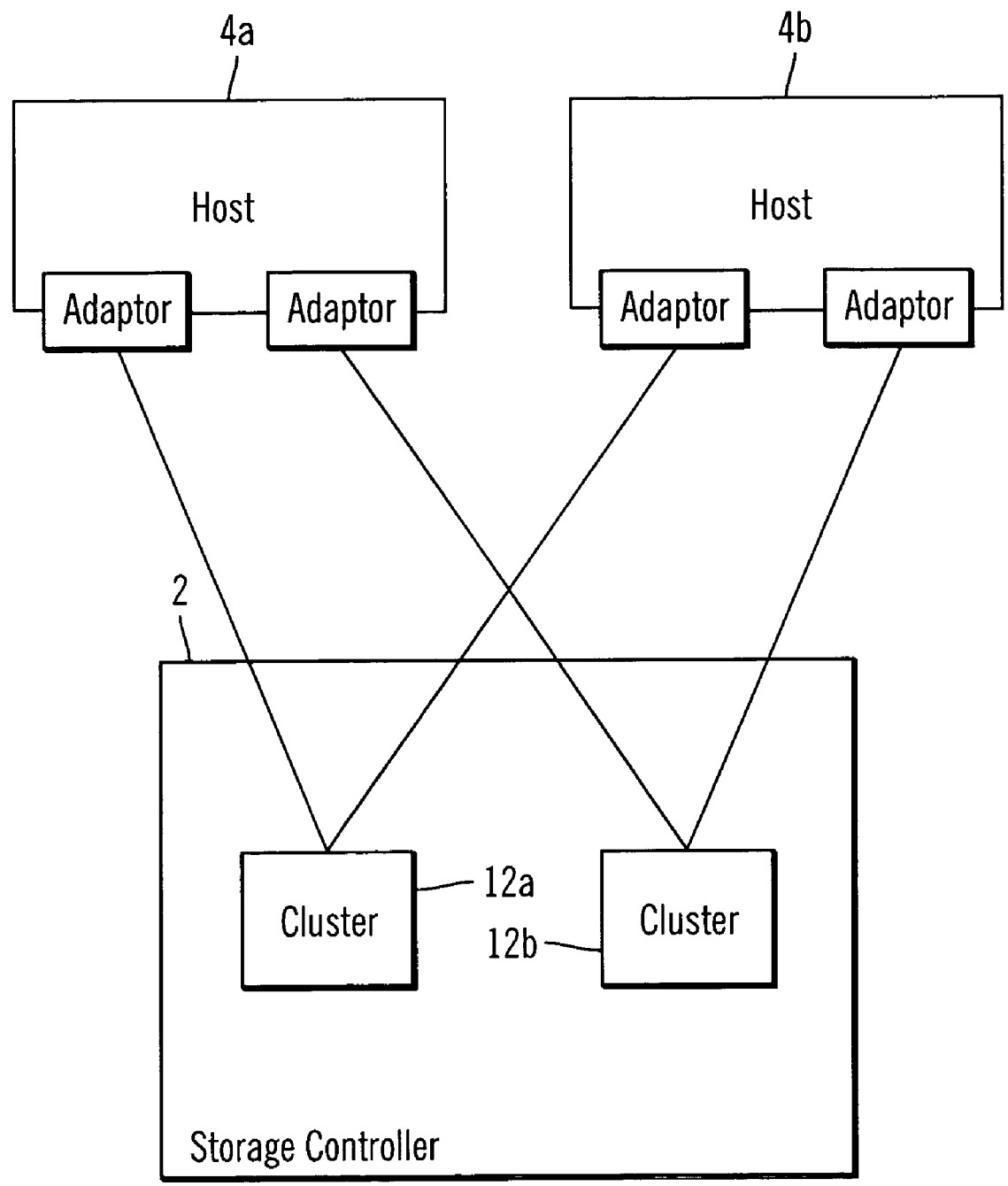
FIGS. 2a and 2b illustrate embodiments for how paths may connect hosts to storage clusters.
Figure 2B:
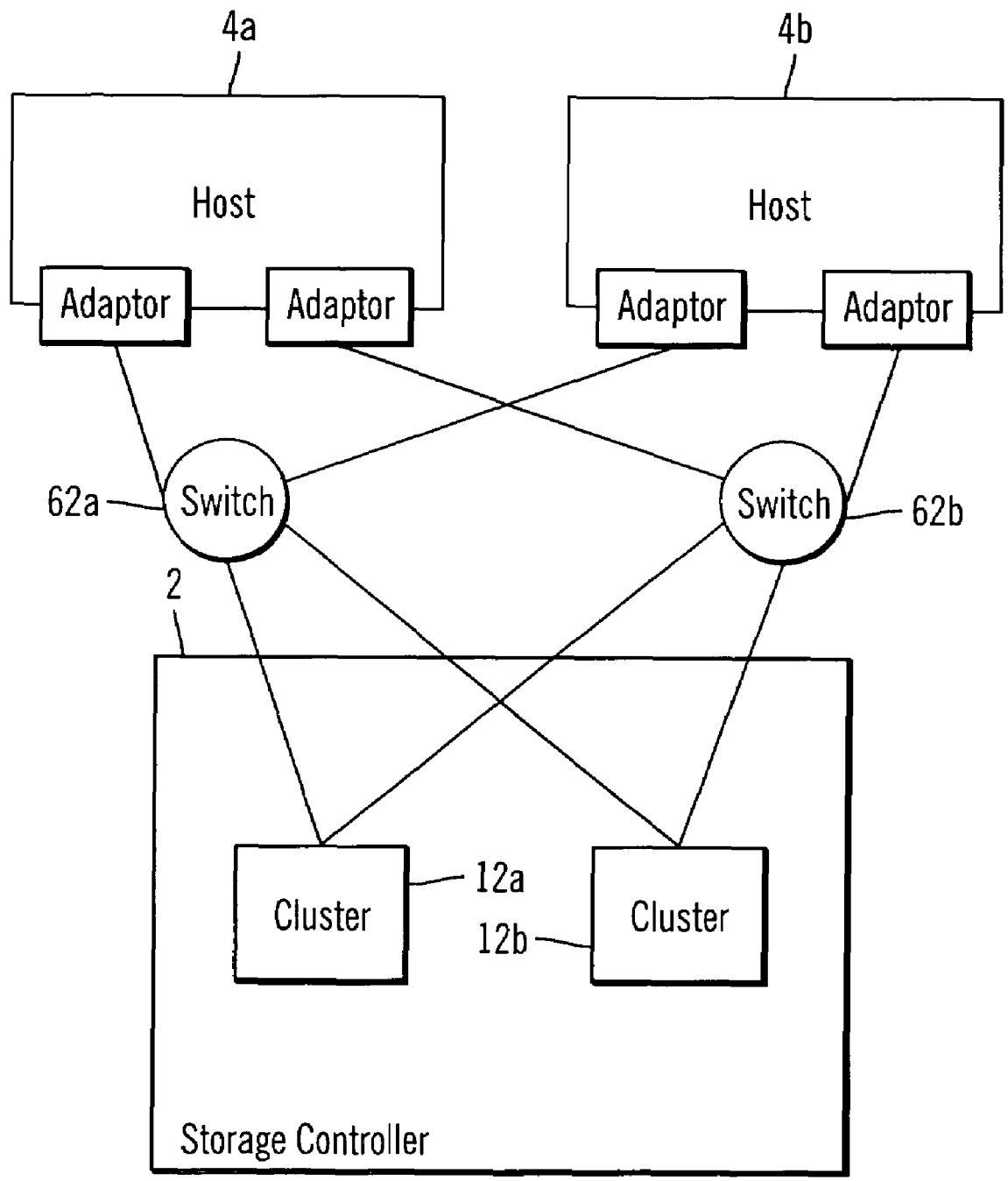

FIGS. 2a and 2b illustrate different configurations of how the hosts 4a and 4b and clusters 12a, 12b in FIG. 1 may connect. FIG. 2a illustrates one configuration of how the hosts 4a, 4b each have multiple adaptors to provide separate paths to the storage clusters 12a, 12b in the storage controller 54, where there is a separate path to each storage cluster 12a, 12b in each host 4a, 4b.

FIG. 2b illustrates an alternative configuration where each host 4a, 4b has one path to each switch 62a, 62b, and where each switch 62a, 62b provides a separate path to each storage cluster 12a, 12b, thus providing each host 4a, 4b additional paths to each storage cluster 12a, 12b.

In one embodiment, either the storage controller 2 or the storage management software 24a, 24b will transfer I/O requests between the clusters to consolidate I/O requests to a same storage location at one storage cluster 12a, 12b to avoid having both storage clusters 12a, 12b write data to a same storage location. Having one storage cluster 12a, 12b serialize writes to the assigned storage location ensures that writes to the location (e.g., volume) will not be written by both storage clusters 12a, 12b out-of-sequence in a manner that could jeopardize data consistency. To transfer I/O requests and write data from one storage cluster 12a, 12b to another, I/O requests are quiesced during the transfer period.

FIGS. 1, 2a, and 2b show a certain number of elements, such as two sets of volumes 10a, 10b, two storages 8a, 8b, two clusters in a storage controller 2, a certain number of hosts, etc. However, additional embodiments may have any number of the illustrated devices, such as sets of volumes, storages, clusters, host adaptors, switches, etc., and actual implementations are not limited to the specific number of components illustrated in the figures.

Figure 3:
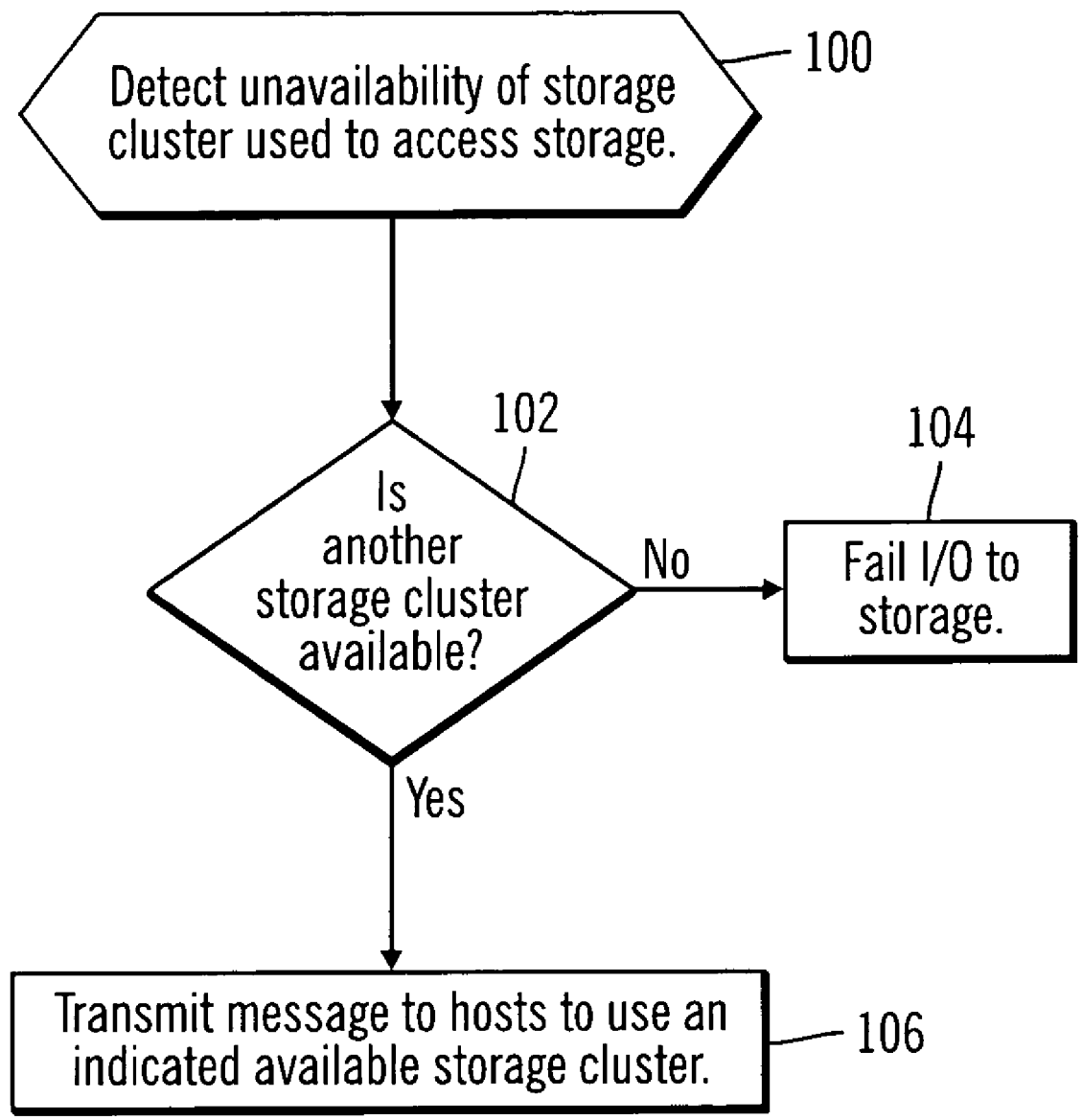
FIGS. 3 and 4 illustrate an embodiment of operations a host performs to select a storage cluster to use to access the storage in response to detecting a failure of a current storage cluster used to access the storage.

FIG. 3 illustrates an embodiment of operations implemented in the I/O manager 26a, 26b . . . 26n code in the hosts 4a, 4b . . . 4n to handle the failure of a storage cluster 12a, 12b being used to access the storage 8a, 8b. A storage cluster 12a, 12b may fail as a result of a power, hardware and/or software malfunction. Further, because the storage clusters 12a, 12b may be located on separate power boundaries, failure of one storage cluster 12a, 12b does not necessarily result in a failure of the other storage cluster. Control begins (at block 100) with the I/O manager 26a, 26b . . . 26n detecting a failure of access to a storage cluster 12a, 12b, which occurs if all paths to the storage cluster 12a, 12b the host 4a, 4b . . . 4n uses are unavailable. If (at block 102) there is no other storage cluster 12a, 12b accessible over the network 6, then the I/O manager 26a, 26b . . . 26n fails any I/O requests to the storage 8a, 8b. Otherwise, if another storage cluster 12a, 12b is accessible, then the I/O manager 26a, 26b . . . 26n transmits (at block 104) a message to hosts 4a, 4b . . . 4n over the network 32, via a broadcast or directly addressing messages to the hosts, instructing the hosts to use an indicated available storage cluster 12a, 12b.

Figure 4:
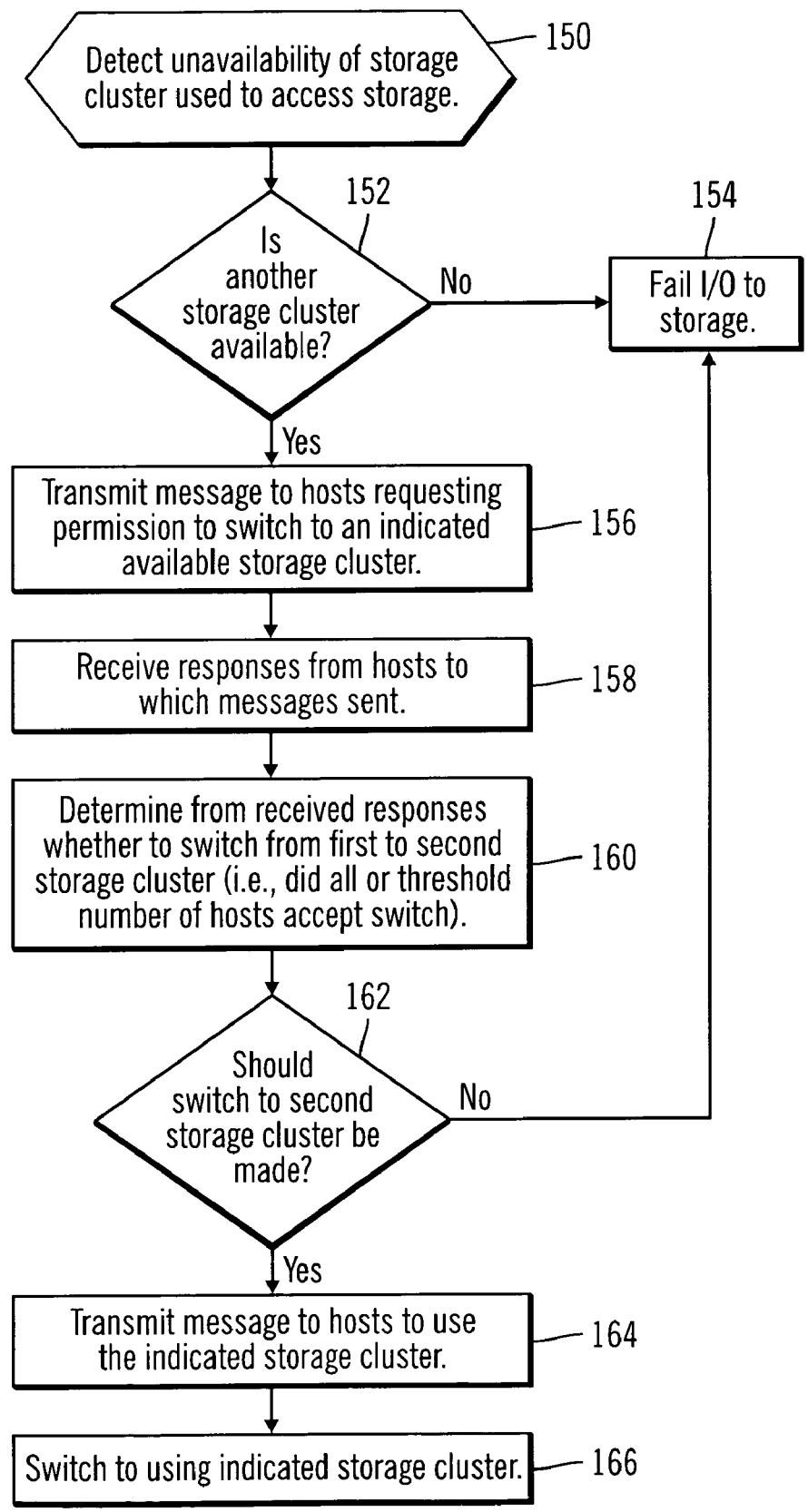

FIG. 4 illustrates an additional embodiment of operations performed by the I/O manager 26a, 26b . . . 26n to handle the detection of a failure of a storage cluster 12a, 12b used to access the storage 8a, 8b. In response to detecting (at block 150) the unavailability or failure of the storage cluster 12a, 12b used to access to the storage 8a, 8b, the I/O manager 26a, 26b . . . 26n determines (at block 152) whether another storage cluster 12a, 12b is available to use to access the storage 8a, 8b. If not, then the I/O manager 26a, 26b . . . 26n fails (at block 154) any I/O requests to the storage 8a, 8b. Otherwise, if one storage clusters 12a, 12b is available, then the I/O manager 26a, 26b . . . 26n transmits (at block 156) a message over the network 32, via a broadcast or directly addressing messages to the hosts, requesting permission to switch to an indicated available storage cluster. In response to receiving (at block 158) responses from the hosts 4a, 4b . . . 4n to which the messages were sent, the I/O manager 26a, 26b . . . 26n determines (at block 160) from the received responses whether to switch from one storage cluster 12a, 12b to another.

In one embodiment, the hosts 4a, 4b . . . 4n receiving the message only grant permission to switch to the indicated storage cluster 12a, 12b if the indicated storage cluster 12a, 12b is available to the host to use to access the storage 8a, 8b. Further, a host may not deny permission to switch if the host is not capable of accessing any storage cluster. If the requested host 4a, 4b . . . 4n cannot access the indicated storage cluster 12a, 12b, then the host 4a, 4b . . . 4n may respond denying permission to switch or indicating that the host cannot make the switch. In one embodiment, the I/O manager 26a, 26b . . . 26n receiving the responses may determine to switch only if all other hosts 4a, 4b . . . 4n can switch to use the indicated storage cluster 12a, 12b to access the storage 8a, 8b. Alternatively, the I/O manager 26a, 26b . . . 26n receiving the responses may determine to switch only if a threshold number or ratio, e.g., majority, of hosts 4a, 4b . . . 4n can use the indicated storage cluster 12a, 12b. Still further, the I/O manager 26a, 26b . . . 26n may provide greater weight to certain hosts 4a, 4b . . . 4n based on a priority criteria, such as whether a host 4a, 4b . . . 4n is executing high priority applications.

If (at block 162) the I/O manager 26a, 26b . . . 26n determined not to switch, then the I/O manager 26a, 26b . . . 26n fails (at block 154) any I/O requests to the storage 8a, 8b. Otherwise, (at block 162) if the determination is made to switch to the available storage cluster 12a, 12b, then the I/O manager 26a, 26b, . . . 26n transmits (at block 164) messages to the hosts 4a, 4b . . . 4n over the network 32 to use the indicated storage cluster 12a, 12b. The I/O manager 26a, 26b . . . 26n then switches (at block 166) to using the available storage cluster 12a, 12b.

Figure 5:
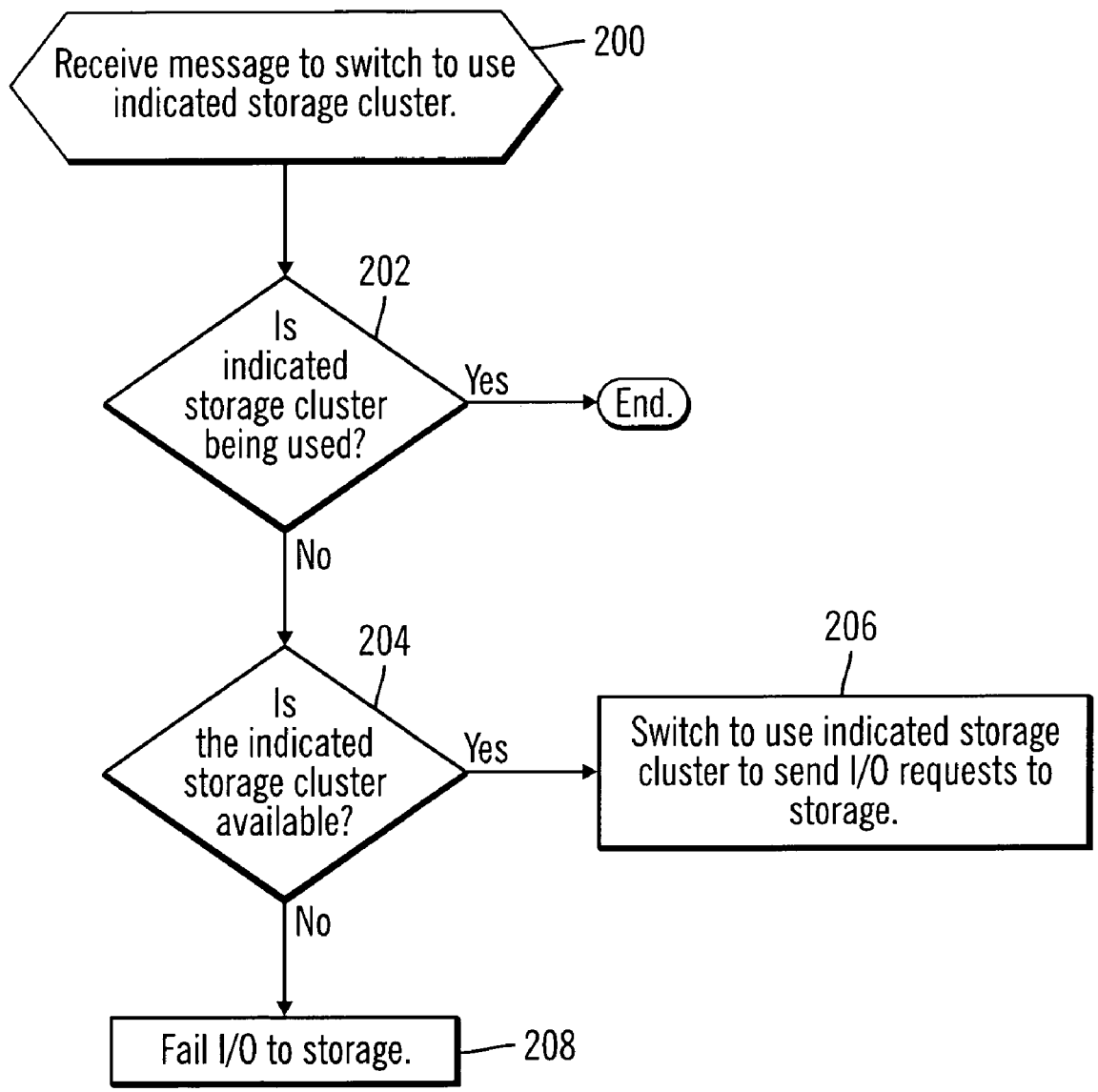
FIG. 5 illustrates an embodiment of operations a host performs in response to receiving a request from another host to switch to use a different storage cluster to access the storage.

FIG. 5 illustrates an embodiment of operations performed by an I/O manager 26a, 26b . . . 26n executing in a host 4a, 4b . . 4n in response to receiving the message to switch the storage cluster 12a, 12b from one I/O manager 26a, 26b . . . 26n detecting a failure and performing the operations of FIG. 3 or 4. In response to receiving (at block 200) the message to switch to use an indicated storage cluster 12a, 12b, the I/O manager 26a, 26b . . . 26n determines (at block 202) whether the indicated storage cluster 12a, 12b is being used to access the storage 8a, 8b. If so, control ends and the host 4a, 4b . . . 4n continues to use the indicated storage cluster 12a, 12b. Otherwise, if (at block 202) the indicated storage cluster 12a, 12b is not currently being used, i.e., is not the preferred storage cluster 12a, 12b, and if (at block 204) the indicated storage cluster 12a, 12b is available, then the I/O manager 26a, 26b . . . 26n switches (at block 206) to use the indicated storage cluster 12a, 12b to access the storage 8a, 8b. Otherwise, if (at block 204) the indicated storage cluster 12a, 12b is not available, then I/O requests to the storage 8a, 8b are failed (at block 208).

The described operations of FIGS. 3, 4, and 5 operate to have as many hosts 4a, 4b . . . 4n as possible use the same storage cluster 12a, 12b so that there is less likelihood that I/O writes to the same location, e.g., track or volume, are handled by different storage clusters 12a, 12b. In the event that certain hosts 4a, 4b . . . 4n cannot switch to using the indicated storage cluster 12a, 12b, then both storage clusters 12a, 12b may concurrently have I/O requests to a same storage location requiring transfer and consolidation of the I/O requests at a single storage cluster 12a, 12b. However, the operations of FIGS. 3 and 4 seek to minimize the need for the storage clusters 12a, 12b to swap I/O requests.

Figure 6:
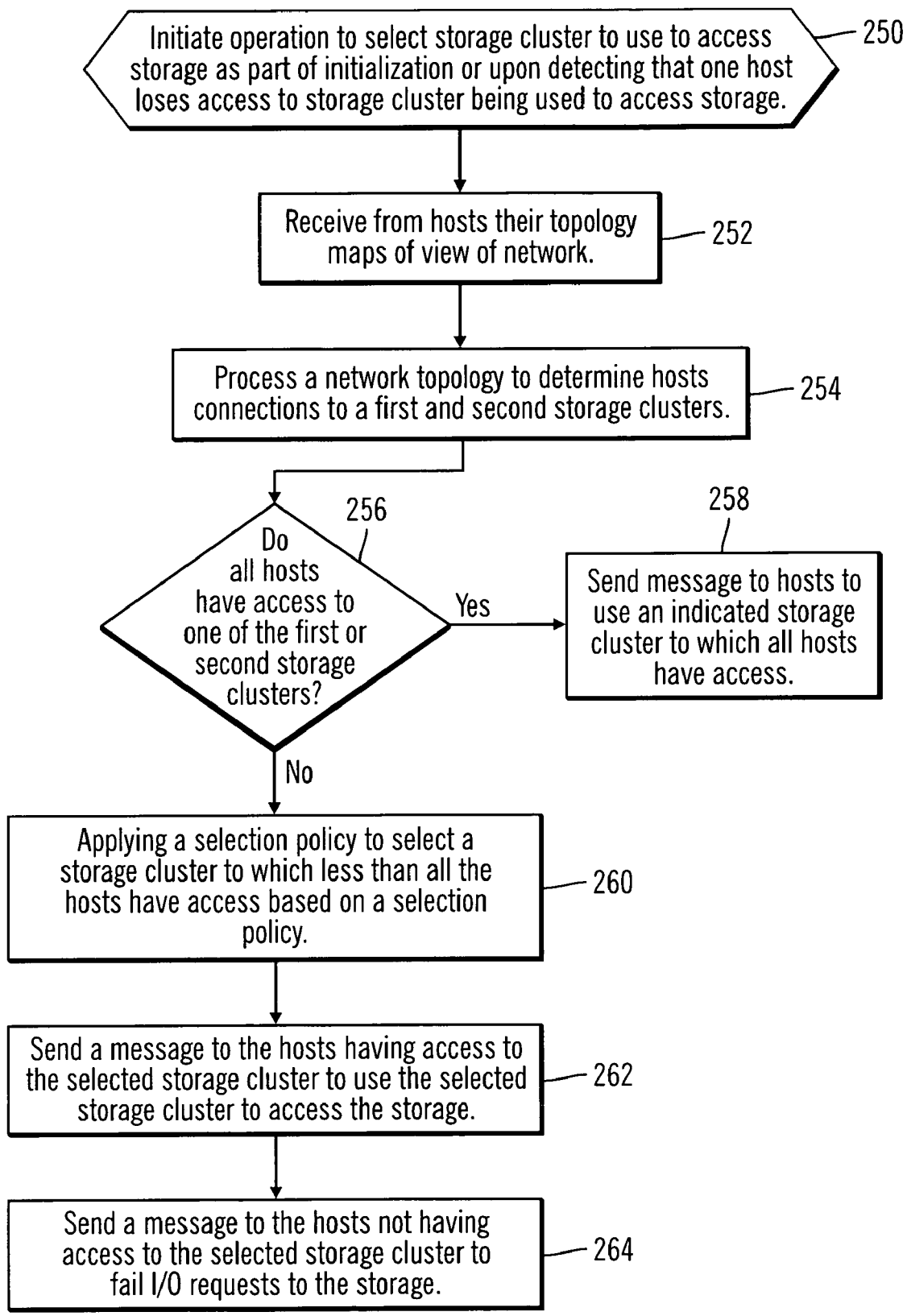
FIGS. 6 and 7 illustrate an embodiment of operations to select one storage cluster for hosts to use to access a storage.

FIG. 6 illustrates an embodiment of operations performed by the network manager 30 to assign a common storage cluster 12a, 12b for the hosts 4a, 4b . . . 4n to use to communicate with the storage 8a, 8b. The network manager 30 may initiate operations (at block 250) to select storage cluster 12a, 12b for the hosts 4a, 4b . . . 4n to use to access the storage 8a, 8b as part of initialization or upon detecting that one host 4a, 4b has lost access to the storage cluster 12a, 12b the host 4a, 4b . . . 4n being used to access the storage 8a, 8b. At some point, the network manager 30 receives (at block 252) from the hosts 4a, 4b . . . 4n their network topology maps providing a view of the connection and paths of the host to other network 6 elements, e.g., switches, hosts, storages, etc. The network manager 30 may gather information on the network topology by accessing switches in the network 6. Alternatively, topology information on the hosts 4a, 4b . . . 4n in the network 6 may be gathered by agent programs (not shown) executing in the hosts 4a, 4b . . . 4n. These agent programs may communicate their network topology information to the network manager 30 via an in-band 6 or out-of-band network 32. Agents may also handle additional communications between the manager 30 and the hosts 4a, 4b . . . 4n to share information and coordinate operations.

Figure 7:
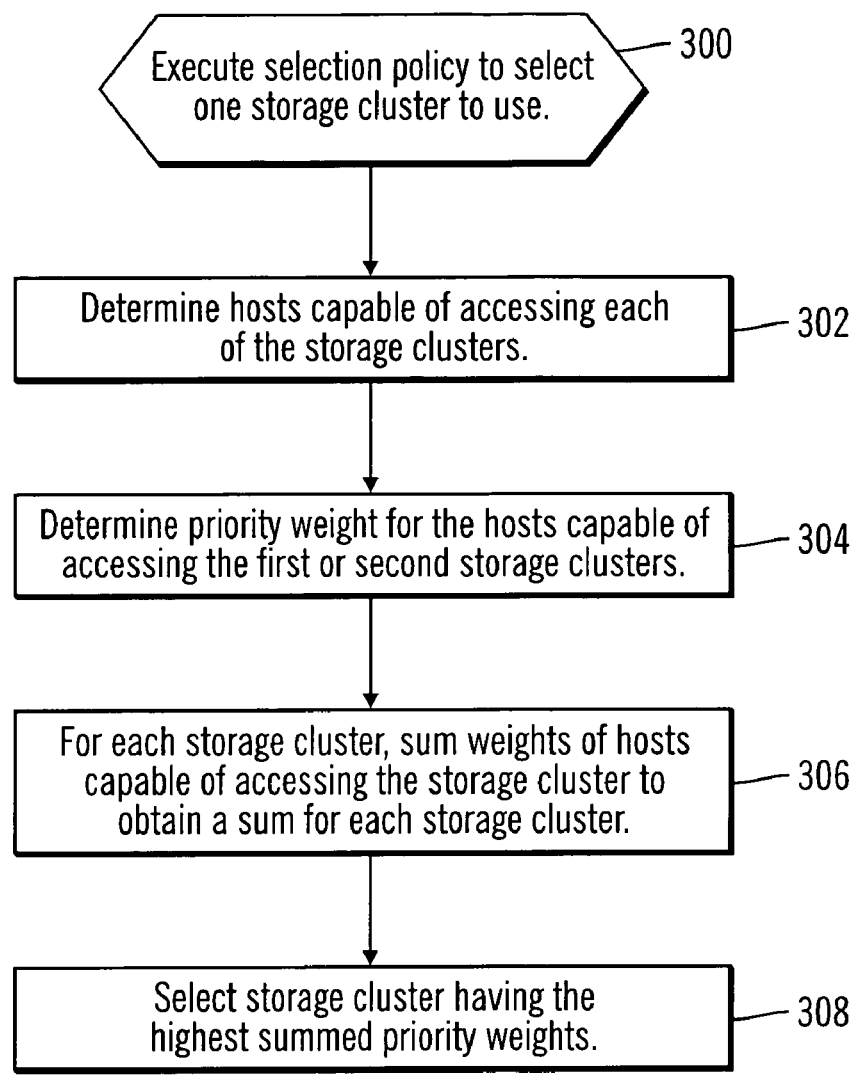

The network manager 30 processes (at block 254) the network topology of the host 4a, 4b . . . 4n connections to determine hosts connections to the storage clusters 12a, 12b. If (at block 256) all hosts have access to one of the storage clusters 12a, 12b, then the network manager 30 sends (at block 258) a message to the hosts 4a, 4b . . . 4n to use an indicated storage cluster 12a, 12b to which all hosts have access. Otherwise, if (at block 256) the network topology indicates that all hosts 4a, 4b . . . 4n do not have access to one of the storage clusters 12a, 12b, then the network manager 30 applies a selection policy to select one of the storage clusters 12a, 12b to which less than all the hosts 4a, 4b . . . 4n have access. In one embodiment, the selection policy may select a storage cluster 12a, 12b to which the greatest number of hosts have access. FIG. 7 illustrates an embodiment of a selection policy that uses priority weights for the hosts 4a, 4b . . . 4n indicating a relative importance of applications that the host services. Next, the network manager 30 sends (at block 262) a message to the hosts 4a, 4b . . . 4n having access to the selected storage cluster 12a, 12b to use the selected storage cluster 12a, 12b to access the storage 8a, 8b. The network manager 30 may also send (at block 264) a message to the hosts 4a, 4b . . . 4n not having access to the selected storage cluster 12a, 12b to fail I/O requests to the storage 8a, 8b. In this way, hosts can use only one of the storage clusters for I/O requests to the storage 8a, 8b, thereby reducing the need for the storage clusters 12a, 12b to transfer I/O requests to each other to consolidate all I/O requests for a storage location at one storage cluster 12a, 12b.

Figure 8:
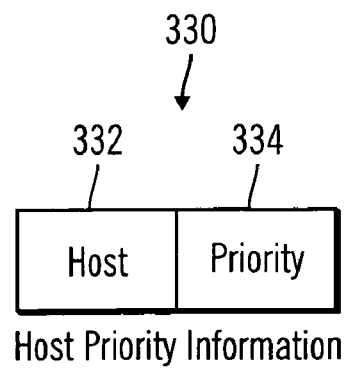
FIG. 8 illustrates an embodiment of host priority information maintained for the hosts and used to select one storage cluster in the operations of FIG. 7.

FIG. 7 illustrates an embodiment of operations of a selection policy for the network manager 30 to use to select one of the storage clusters 12a, 12b for the hosts 4a, 4b . . . 4n to use to access the storage 8a, 8b. Upon executing (at block 300) a selection policy to select one storage cluster 12a, 12b, which may occur at block 260 in FIG. 6, the network manager 30 determines (at block 302) hosts 4a, 4b . . . 4n capable of accessing each of the storage clusters 12a, 12b. The network manager 30 then determines (at block 304) the priority weights for the determined hosts 4a, 4b . . . 4n capable of accessing the storage clusters 12a, 12b. FIG. 8 provides an embodiment of host priority information 330 the network manager 30 maintains for each host, identified in field 332, indicating a relative priority weight 334 for the identified host. A host that is executing higher priority applications, such as mission critical applications or servicing more critical or important clients, may be assigned a higher priority weight 334. Returning to FIG. 7, for each storage cluster 12a, 12b, the network manager 30 sums (at block 306) the determined weights of the hosts 4a, 4b . . . 4n capable of accessing the storage cluster 12a, 12b to obtain a sum for each storage cluster 12a, 12b. The I/O manager 30 selects (at block 308) the storage cluster 12a, 12b having the highest summed priority weights.

Alternative calculation techniques may be used to determine the storage cluster 12a, 12b accessed by hosts 4a, 4b . . . 4n having a cumulative highest relative priority. For instance, priority weights may be provided for different host-volume pairs, such that different priority weights may be used for the same host depending on the volume subject to the I/O request. Thus, a same priority weight may be associated with multiple hosts for one or more volumes or different priority weights may be provided for different host-volume pairs.

Described embodiments provide techniques for hosts or a storage manager to select one of a plurality of storage clusters the hosts 4a, 4b . . . 4n may use to access a storage, where the storage clusters enable access to the same storage. In certain embodiments, directing hosts to use only one storage cluster 12a, 12b for the storage locations avoids the needs for the clusters 12a, 12b to take corrective action if writes to the same storage location are pending at both storage clusters 12a, 12b.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the I/O manager 26a, 26b . . . 26n or network manager 30 selects a storage cluster 12a, 12b to use to access the storage. This selection may be done for all volumes 10a, 10b accessible through the storage clusters 12a, 12b. In certain embodiments, the selection of a storage cluster 12a, 12b to use for access may be determined on a volume-by-volume basis, such that different storage clusters may be selected to use to access different volumes 10a, 10b in the storage 8a, 8b based on the selection criteria used. In this way, certain hosts 4a, 4b . . . 4n may be able to access certain volumes 10a, 10b through a selected storage cluster 12a, 12b (selected according to the operations of FIGS. 4, 6, and 7), but not be able to access other volumes when a storage cluster 12a, 12b is selected for certain volumes 10a, 10b that is not available to the host 4a, 4b . . . 4n.

In described embodiments, the techniques for selecting a storage cluster for hosts to use was done for storage clusters that are managed so that a received write operation is transferred to another storage cluster already having pending I/O requests to the same storage location. In additional embodiments, the described operations for selecting a storage cluster 12a, 12b for hosts to use may be done in storage controller systems that allow two different storage clusters to execute write requests at a same storage location.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method performed by a host system in communication with additional host systems and a first and second storage clusters over a network to access a storage, comprising:

transferring input/output (I/O) requests to the first storage cluster over the network to access the storage, wherein the storage may be additionally accessed via the second storage cluster over the network, and wherein both the first and second storage clusters are capable of accessing the storage;

detecting an unavailability of a first storage cluster when the second storage cluster is available; and transmitting a request to hosts over the network to use the second storage cluster to access the storage, wherein the hosts receiving the transmitted request send I/O requests to the storage via the second storage cluster.

2. The method of claim 1, further comprising:

sending messages to hosts over the network requesting permission to switch from using the first storage cluster to the second storage cluster;

receiving responses from the hosts to the messages indicating whether the hosts provide permission to switch from the first to the second storage cluster; and determining from the received responses whether to switch from using the first to the second storage cluster to send I/O requests to the storage.

3. The method of claim 2, wherein selection is not made to use the second storage cluster and the requests are not transmitted to the hosts if the determination is made to not switch from using the first storage cluster to using the second storage cluster based on the received responses.

4. The method of claim 2, wherein the determination is made to switch from using the first storage cluster to the second storage cluster if all hosts receiving the message respond indicating permission to switch from the first storage cluster to the second storage cluster.

5. The method of claim 3, further comprising:

failing I/O requests to the storage in response to determining not to switch from using the first storage cluster to using the second storage cluster.

* * * * *